United States Patent
Pletter

(10) Patent No.: US 9,009,669 B2
(45) Date of Patent: Apr. 14, 2015

(54) VISUAL USER INTERFACE VALIDATOR

(75) Inventor: Daniel L. Pletter, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 656 days.

(21) Appl. No.: 12/969,294

(22) Filed: Dec. 15, 2010

(65) Prior Publication Data

US 2011/0276946 A1    Nov. 10, 2011

Related U.S. Application Data

(60) Provisional application No. 61/332,664, filed on May 7, 2010.

(51) Int. Cl.
| | | |
|---|---|---|
| *G06F 9/44* | (2006.01) | |
| *G06F 11/36* | (2006.01) | |
| *G06F 9/445* | (2006.01) | |

(52) U.S. Cl.
CPC .............. *G06F 11/3688* (2013.01); *G06F 8/65* (2013.01); *G06F 9/4443* (2013.01)

(58) Field of Classification Search
CPC .............. G06F 8/30; G06F 8/34; G06F 8/65; G06F 11/3664; G06F 11/3688
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |

(Continued)

OTHER PUBLICATIONS

Selenium Documentation, Release 1.0, Feb. 2010, 164 pages.*

(Continued)

*Primary Examiner* — Thuy Dao
(74) *Attorney, Agent, or Firm* — Weaver Austin Villeneuve & Sampson LLP

(57) ABSTRACT

Various embodiments described or referenced herein are directed to different devices, methods, systems, and computer program products for testing a user interface component. A client-side operation for rendering the user interface component may be performed. The rendered user interface component may be stored as a user interface component test image simulating a visual presentation of the user interface component at a client machine. A user interface component expected image may be retrieved from a storage medium accessible to the server. The user interface component expected image may represent an expected visual presentation of the rendered user interface component. A determination may be made as to whether the user interface component test image matches the user interface component expected image. When the user interface component test image does not match the user interface component expected image, an indication of an error condition may be provided.

23 Claims, 6 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,240,258 B1 | 7/2007 | Hayes |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,900,192 B2 * | 3/2011 | Patterson ................ 717/125 |
| 7,945,653 B2 | 5/2011 | Zuckerberg et al. |
| 8,005,896 B2 | 8/2011 | Cheah |
| 8,006,231 B2 * | 8/2011 | Peipelman et al. ........... 717/124 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,214,805 B2 * | 7/2012 | Stewart ................. 717/125 |
| 8,275,836 B2 | 9/2012 | Beaven et al. |
| 8,312,428 B2 * | 11/2012 | Zhao ................. 717/113 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,533,664 B2 * | 9/2013 | Wang et al. ............ 717/106 |
| 8,566,301 B2 | 10/2013 | Rueben et al. |
| 8,566,792 B2 | 10/2013 | Chasman et al. |
| 8,646,103 B2 | 2/2014 | Jakobson et al. |
| 8,713,530 B2 | 4/2014 | Waite et al. |
| 2001/0032332 A1 | 10/2001 | Ward et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0138510 A1 | 9/2002 | Tan |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0023639 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153772 A1 * | 8/2004 | Gorshenev et al. ......... 714/25 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188357 A1* | 8/2005 | Derks et al. ............... 717/124 |
| 2006/0225054 A1 | 10/2006 | Sentovich et al. |
| 2007/0050467 A1 | 3/2007 | Borrett et al. |
| 2008/0082572 A1 | 4/2008 | Ballard et al. |
| 2008/0183687 A1 | 7/2008 | Law |
| 2008/0249972 A1 | 10/2008 | Dillon |
| 2008/0295076 A1* | 11/2008 | McKain et al. ............... 717/124 |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0083097 A1 | 4/2010 | Katz et al. |
| 2011/0145803 A1 | 6/2011 | Soderstedt |
| 2011/0179398 A1 | 7/2011 | Peterson |
| 2011/0276945 A1 | 11/2011 | Chasman et al. |
| 2011/0283181 A1 | 11/2011 | Waite et al. |
| 2011/0283267 A1 | 11/2011 | Waite et al. |
| 2012/0233137 A1 | 9/2012 | Jakobson et al. |
| 2012/0290407 A1 | 11/2012 | Hubbard et al. |
| 2013/0167122 A1 | 6/2013 | Chasman et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0165040 A1* | 6/2014 | Augustin et al. ............... 717/124 |
| 2014/0359537 A1 | 12/2014 | Jackobson et al. |

OTHER PUBLICATIONS

Bowen et al., UI-driven test-first development of interactive systems, Jun. 2011, 10 pages.*

USim: A User Behavior Simulation Framework for Training and Testing IDSes in GUI Based Systems, Apr. 2006, 8 pages.*

U.S. Office Action dated Aug. 14, 2013 issued in U.S. Appl. No. 13/104,772.

U.S. Office Action dated Aug. 14, 2013 issued in U.S. Appl. No. 13/104,775.

U.S. Notice of Allowance dated Nov. 5, 2012 issued in U.S. Appl. No. 12/943,786.

U.S. Notice of Allowance dated Aug. 28, 2013 issued in U.S. Appl. No. 12/943,786.

Aulbach et aL (Jun. 9-12, 2008) "Multi-Tenant Databases for Software as a Service: Schema-Mapping Techniques", ACM SIGMOD 2008, [Retrieved on Sep. 5, 2012]. Retrieved from the internet: <URL: http://dl.acm.org/citation.cfm?id=1376736> 12 Pages (1195-1206).

"Google Plus Users", Google+Ripples, Oct. 31, 2011 [retrieved on Feb. 21, 2012 from Internet at http://www.googleplusers.com/google-ripples.html], 3 pages.

U.S. Final Office Action dated Feb. 11, 2014 issued in U.S. Appl. No. 13/104,772.

U.S. Notice of Allowance dated Feb. 19, 2014 issued in U.S. Appl. No. 13/104,775.

U.S. Notice of Allowance dated Sep. 23, 2014 issued in U.S. Appl. No. 13/104,772.

U.S. Notice of Allowance dated Dec. 10, 2014 issued in U.S. Appl. No. 13/104,772.

* cited by examiner

VISUAL USER INTERFACE VALIDATOR

PRIORITY AND RELATED APPLICATION DATA

This application claims priority to provisional U.S. Patent App. No. 61/332,664, filed on May 7, 2010, entitled "Method and System for Rendering a Page in a Multitenant Environment," by Daniel L. Pletter, which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to on-demand services provided over a data network such as the Internet, and more specifically to user interfaces provided via an on-demand service environment.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to embodiments by one skilled in the art without departing from the spirit and scope of the disclosure.

DETAILED DESCRIPTION

Figure 1:
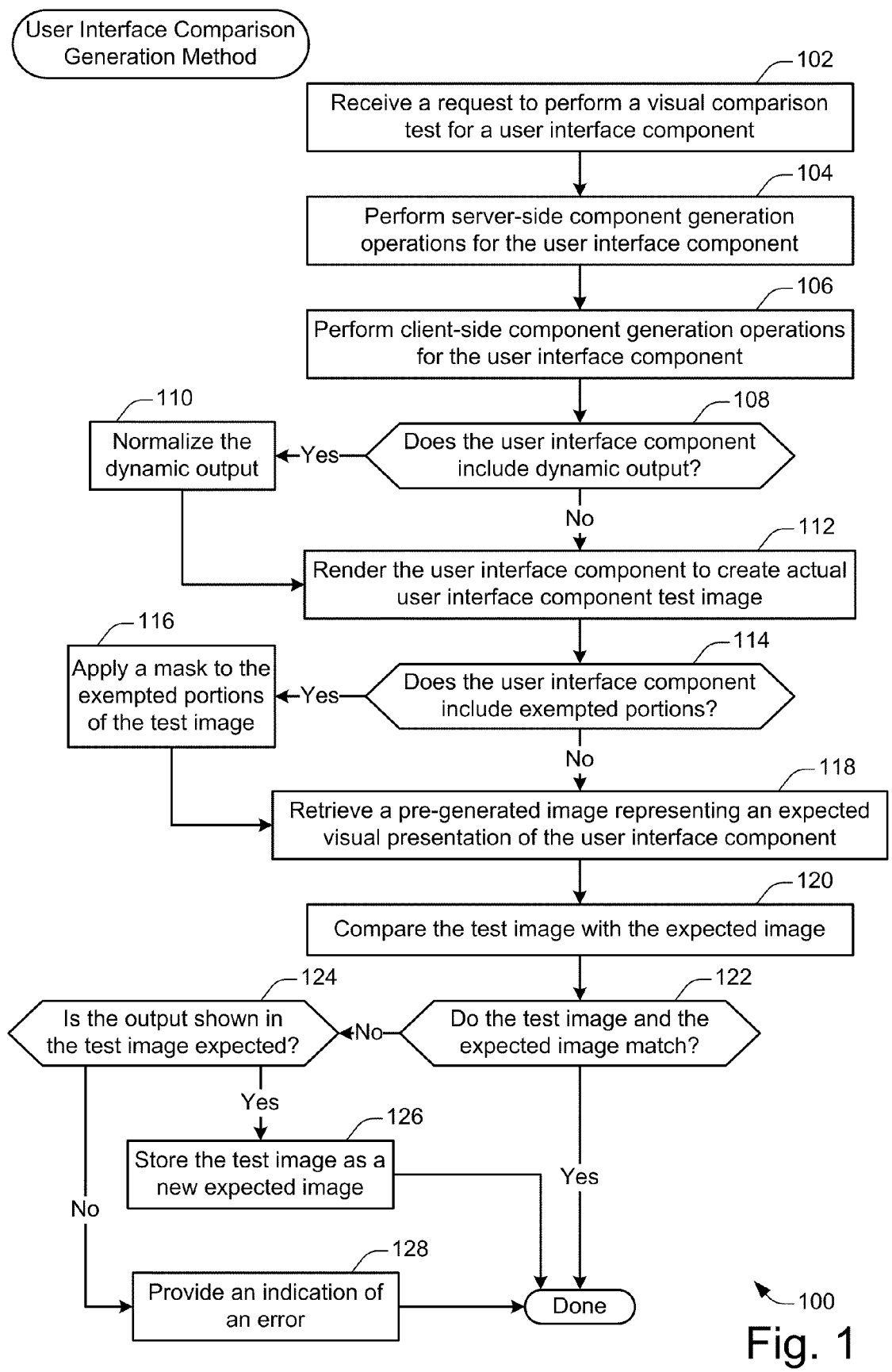
FIG. 1 shows a flow diagram of a method 100 for generating a user interface component comparison, performed in accordance with one embodiment.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

In some embodiments, user interface components may be used to provide information, receive information, or facilitate interaction with information. Servers may process and/or provide data for generating user interface components at client machines. This information may include programming language instructions, markup code, content, and other data presented in accordance with predefined formats, computer code languages, instruction sets, programming frameworks, or other organizational structures.

In some embodiments, user interface components may be provided using technologies and formats that are widely used for the organization and display of information, such as HTML, Java®, JavaScript®, Cascading Style Sheets (CSS), Adobe® PDF, or DOC format. Alternately, or additionally, user interface components may be provided using proprietary technologies and formats that are made available by the provider of an on-demand service environment, such as the Lumen™, Apex™, and VisualForce™ technologies available from Salesforce.com® of San Francisco, Calif.

In some embodiments, user interface components may be provided to tenants of an on-demand service environment. An on-demand service environment may be used to provide on-demand computing services, also known as cloud computing services, to client machines in communication with the on-demand service environment via a network such as the Internet.

In some embodiments, a server system used to provide information for generating user interface components may employ a multi-tenant database. As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. Additional details regarding multi-tenant database systems are discussed herein with respect to FIGS. 4A-6.

In some embodiments, user interface components may be developed by a service provider. For example, the service provider of an on-demand service environment may provide standardized user interface components for interacting with the on-demand service environment or for performing the types of tasks that users of the on-demand service environment may wish to perform.

In some embodiments, user interface components may be developed by a user. For example, an organization that uses an on-demand service environment may develop its own specialized user interface components to perform tasks specific to the needs of the organization.

In some embodiments, user interface components may be developed by a third party to a client-server interaction. For example, a third party organization participating in an on-demand service environment may develop a user interface component for use in the on-demand service environment and may freely provide or sell access to this component to other organizations participating in the on-demand service environment.

Various changes may affect the appearance of a user interface component in unanticipated ways. For example, changes to source code, content, markup language, style data, or other information used to create the user interface component could have unexpected consequences for the appearance of the user interface component. As another example, changes to a server, service environment, programming language, rendering engine, software framework, information format, or other technology used to specify or create the user interface component may yield unexpected results when the user interface component is displayed.

In some embodiments, developers may ensure that user interface components appear correctly and exhibit desired behavior by testing the visual presentation of the user interface components. Testing of user interface components allows the developers to ensure that undesired behavior is quickly identified and does not negatively affect the experience of users.

In some embodiments, testing may be performed by comparing a visual appearance of a user interface component under certain conditions to an expected appearance of the user interface component under those conditions. A user interface component may be tested by generating a simple page that contains the user interface component, as well as any necessary supporting components. The result of this page generation may include, for example, HTML code. If this HTML code is correct, it may be saved as expected output for later comparison. On a subsequent run of the test, the actual output may be compared to the expected output. If the actual output differs from the expected output, the test may be considered a failure. If the failure is expected, the actual output may be stored as the new expected output.

However, comparing actual server output to expected server output may, at least in some instances, fail to detect anomalies in the appearance of the user interface component. In many technologies for providing user interface components from a server for display at a client machine, the client machine performs at least some of the operations for rendering a user interface component. For example, in the case of a web page, resources outside of HTML code may significantly affect the rendering of a component. A change to Cascading Style Sheet (CSS) code, for instance, may ripple through and break or otherwise change the behavior of a user interface component provided using HTML code. Comparing only the actual server output to the expected server output may not identify such changes.

In some embodiments, user interface components may be rendered primarily at the client machine. For example, rendering is performed primarily on the client machine when displaying user interface components written for use with a JavaScript® rendering engine such as Sencha ExtJS (available from Sencha Inc. of Palo Alto, Calif.), Sencha Touch, The Dojo Toolkit (available from the Dojo Foundation), and The YUI Library (available from Yahoo! Inc. of Sunnyvale, Calif.). As another example, the Lumen™ framework uses a combination of server-side and client-side rendering to provide user interface components.

In some embodiments, the output of the server may be very similar to the input if a component is rendered primarily on the client-side. In other words, the server may perform relatively few operations for generating the user interface component. Instead, the code used to generate the user interface component may be passed largely or partially unaltered to the client machine for rendering. In this case, comparing an actual output of the server to an expected output of the server may amount to little more than comparing the input of the server to itself.

In some embodiments, user interface components that are rendered at least partially on the client machine may be tested at the server by simulating the operation of the client machine. For example, a rendering operation that would normally be performed by the client machine may be performed at the server to generate a rendered image of the user interface component that may be compared to an expected image of the user interface component.

FIG. 1 shows a flow diagram of a method 100 for generating a user interface component comparison, performed in accordance with one embodiment. The method 100 may render a normalized user interface component, compare the output to an expected appearance of the user interface component, and provide an indication of any differences between the two images.

In some embodiments, the user interface comparison generation method 100 may be performed at one or more servers, such as a server configured to provide services via an on-demand service environment. The server may have access to a database, such as a multitenant database accessible to a plurality of tenants in the on-demand service environment.

Additional details regarding servers, databases, and on-demand service environments according to various embodiments disclosed herein are discussed in greater detail with respect to FIGS. 4A-6.

In some embodiments, the user interface comparison generation method 100 may be performed without presenting an image to a user on a display screen. For example, the method may be run as a task on a server, and a user such as a developer may be notified only if a mismatch occurs. Alternately, or additionally, the method 100 may be performed in conjunction with an interface such as that shown in FIGS. 3A-3C that displays the compared images for review by a user.

At 102, a request to perform a visual comparison test for a user interface component is received. In some embodiments, the request may be received from a user. For example, a developer who has modified a user interface component may initiate a test of the user interface component to ensure that modifications to the user interface component have not resulted in unexpected changes to the component's behavior or appearance.

In some embodiments, the request may include an indication of test data or other conditions for testing the user interface component. For example, a user interface component may have a different visual presentation depending on test data or parameters used to generate the user interface component. Accordingly, a user interface component may be tested together with contextual information to determine whether the user interface component presents as expected in a certain context.

In some embodiments, the request may be received automatically or periodically. For example, a scheduled test job may periodically test all user interface components, user interface components that were recently modified, or other selected portions of the available user interface components. As another example, a test may be automatically run when a user interface component is modified and stored in the database. By periodically or automatically testing user interface components, errors or discrepancies in user interface components may be detected with limited human intervention.

At 104, server-side component generation operations for the user interface component are performed. The appropriate server-side component generation operations may be determined in accordance with the technology used to provide the requested user interface component.

In some embodiments, the server-side component generation operations include retrieving source code, markup, and/or data used to generate the requested user interface component. When the user interface component is rendered primarily on the client-side, further processing operations may be unnecessary.

In some embodiments, the server-side component generation operations may include more extensive processing. For example, the server may execute programming language instructions to generate an intermediate representation of the user interface component that may be passed to the client machine for further processing and/or rendering.

At 106, client-side component generation operations for the user interface component are performed. As with the server-side operations, the appropriate client-side operations may be determined in accordance with the technology used to provide the requested user interface component.

In some embodiments, server output may be provided to a software tool such as a web browser that performs client-side rendering. Additionally, tools may be used to automatically execute the rendering software, open the page that execute the test, close the rendering software, or perform other operations. For example, the Selenium™ suite of tools available at http://seleniumhq.org may be used to render a user interface component in a manner that it would likely appear in any one of various web browsers. Alternatives to Selenium include, but are not limited to: the Windmill, FITnesse, WebDriver, Watin, Watir, Sahi, and Canoo Webtest tools.

In some embodiments, client-side operations may be relatively simple. For example, a web page written in HTML may be loaded and processed by a rendering engine similar to a web browser. In other embodiments, more complex client-side operations may be involved. For example, a JSON object may be provided to a rendering engine loaded in a web browser or in web browser simulation software. The rendering engine may be provided using an ECMAScript compatible scripting language such as JavaScript®. The rendering engine may process the JSON object to output HTML that may be used for rendering an image.

At 108, a determination is made as to whether the expected output information includes dynamic content. In some embodiments, the presence of dynamic content may be identified by a user, such as the author of the test. For example, a user may be presented with a rendered user interface component to identify portions of the user interface component that include dynamic content.

In some embodiments, the user may adjust the test data or system conditions used to generate the rendered user interface component in order to render a normalized image. For example, the user may specify that the test will be run with a certain set of test data, with a certain user name, with a certain system time and date, or with normalized data for any data that may be used as input to the test.

In some embodiments, this determination may be made automatically. For example, the expected information may be analyzed to identify portions of the user interface component that may change between successive renderings. Analysis of the expected information may include analyzing source code or markup used to create the user interface component. As another example, the same user interface component may be rendered with different test data, and the different results may be used to identify the presence of dynamic content.

In some embodiments, the determination as whether the user interface component includes dynamic content may be made by accessing information relating to a previously-stored expected image of the user interface component. For example, when the expected image was originally stored, dynamic content in the expected image may have been identified. Identification of dynamic content when storing an expected image is discussed in greater detail with respect to operations 204, 206, and 208 of FIG. 2.

At 110, the identified dynamic content is normalized. In some embodiments, the dynamic output may be normalized by replacing the dynamic output with static output such as a standard image or block of text. In this case, the standard image or block of text, as well as identification information for the dynamic output, may be stored with the expected user interface component output information so that the dynamic output may be normalized in successive renderings of the user interface component.

In some embodiments, source code or markup in the expected user interface component output information may be modified to normalize the dynamic content. For example, specialized tags may be inserted to identify the location of dynamic content and/or allow static content to be inserted in its place.

In some embodiments, dynamic content may be normalized based on normalization information relating to a previously-stored expected image of the user interface component. This normalization information may include information identifying the presence and/or location of dynamic content, as well as information identifying static content for replacing the dynamic content. Identification of dynamic content when storing an expected image is discussed in greater detail with respect to operations 204, 206, and 208 of FIG. 2.

At 112, the user interface component is rendered to create a user interface component test image. The test image is also known as an actual image. The test image illustrates a simulation of a visual presentation of the user interface component on a display device at a client machine. An example of a rendered test image is displayed in the user interface shown in FIG. 3A. In some embodiments, rendering the user interface may include one or more operations to save the user interface for comparison.

In some embodiments, the user interface component may be rendered by a software tool that simulates client-side rendering software. For example, the Selenium™ suite of tools available at http://seleniumhq.org may be used to render a user interface component in a manner that it would likely appear in any one of various web browsers.

In some embodiments, the user interface component may be rendered by a web browser program. The rendered image may be saved by using an image-capture feature with a web browser such as Firefox® or Chrome™. Alternately, the rendered image may be saved by using a separate program such as Snagit™, available from TechSmith™ Corporation of Okemos, Mich. As another alternative, the rendered image may be saved by using an image capture feature associated with an operating system, such as the print screen function that may be used in Linux, Microsoft Windows®, or Mac OS®.

At 114, a determination is made as to whether the user interface component includes any exempted portions. In some embodiments, whether the user interface component includes any exempted portions may be determined based on input received from a user. A user such as the test author may be provided with a user interface component that allows the user to crop exempted portions of the user interface component. The user may crop the exempted portions by drawing boxes over areas that should be masked from comparison. Then, the images may be cropped to exclude the exempted portions. The exempted portions of both the test image and the expected image may be covered with a mask such as a black, white, or otherwise colored box before doing the comparison using coordinates provided by the cropping/masking user interface before doing the comparison. By masking the exempted portions, the exempted areas will not be identified as causing a test failure during the comparison.

In some embodiments, the determination may be made automatically. For example, user interface information may be analyzed to identify portions of the user interface component that may change between successive renderings. Analysis of the user interface information may include analyzing source code or markup used to create the user interface component. As another example, the same user interface component may be rendered with different test data, and the different results may be used to identify the presence of dynamic content.

In some embodiments, whether the user interface component includes any exempted portions may be determined based on previously-stored stored mask information for the user interface component. Such information may be created and stored when generating an expected image. The generation and storage of mask information is discussed in greater detail with respect to operations 210, 212, 214, and 216 in FIG. 2.

At 116, a mask is applied to the exempted portions of the test image. In some embodiments, the mask may be a white region corresponding to the exempted portion. The mask may include a label identifying it as a mask. However, the appearance of the mask is unimportant so long as identical mask is applied to the expected user interface component image. As long as a successive rendering of the user interface component applies the same mask in the same location, the mask will not register as a difference in the comparison of the actual user interface component image to the expected user interface component image.

At 118, a pre-generated image representing an expected visual presentation of the user interface component is retrieved. This pre-generated image is also known as an expected image, a baseline image, or a gold file. An example of an expected image is displayed in the user interface shown in FIG. 3B.

In some embodiments, when the expected image is retrieved, any related information may also be retrieved. For example, information regarding dynamic content, masks, test data, and/or other contextual data may be stored along with the expected image. Some of the types of information that may be stored with the expected image are discussed in greater detail with respect to FIG. 2.

Figure 5:
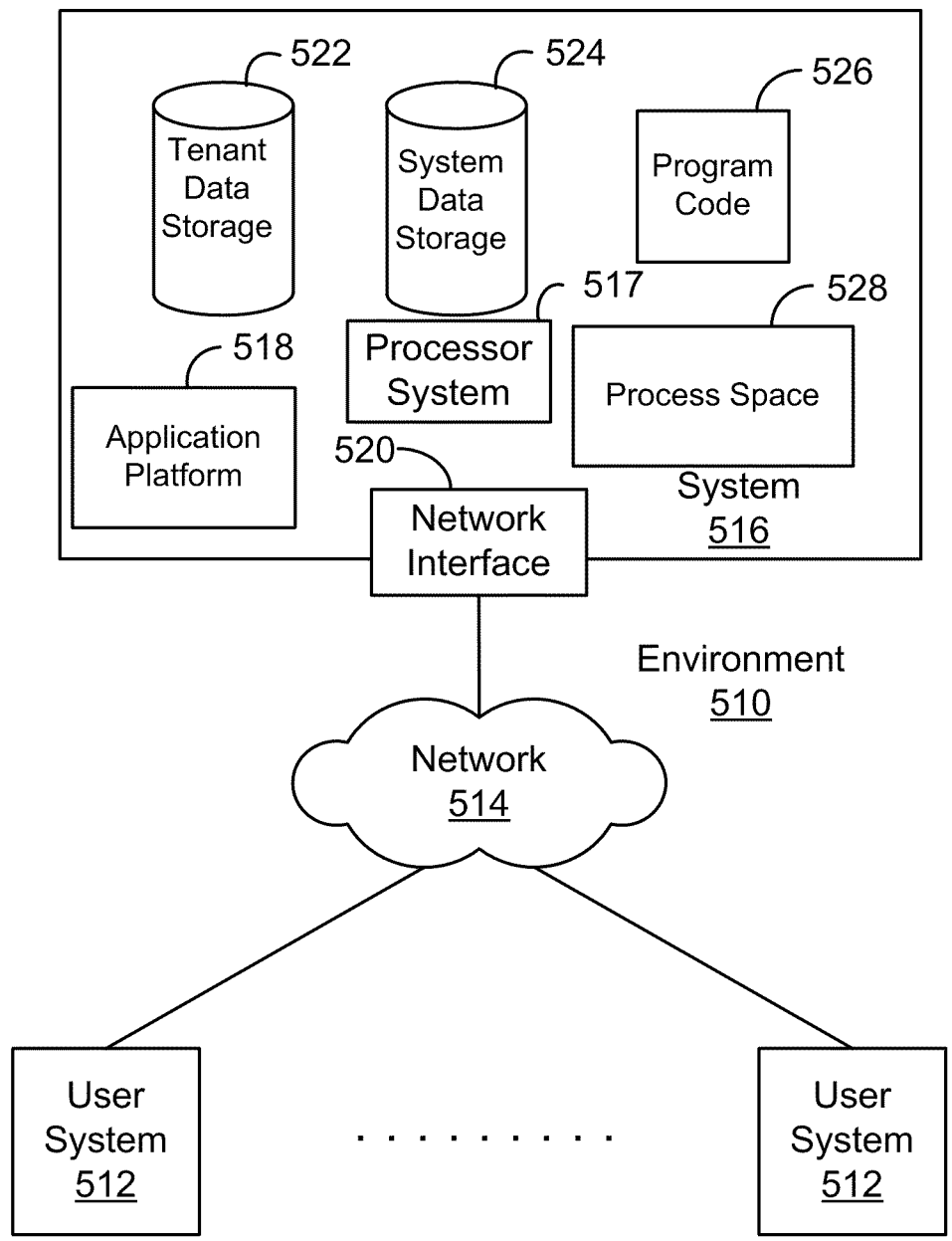
FIG. 5 shows a system diagram 510 illustrating the architecture of a multitenant database environment, in accordance with one embodiment.
Figure 6:
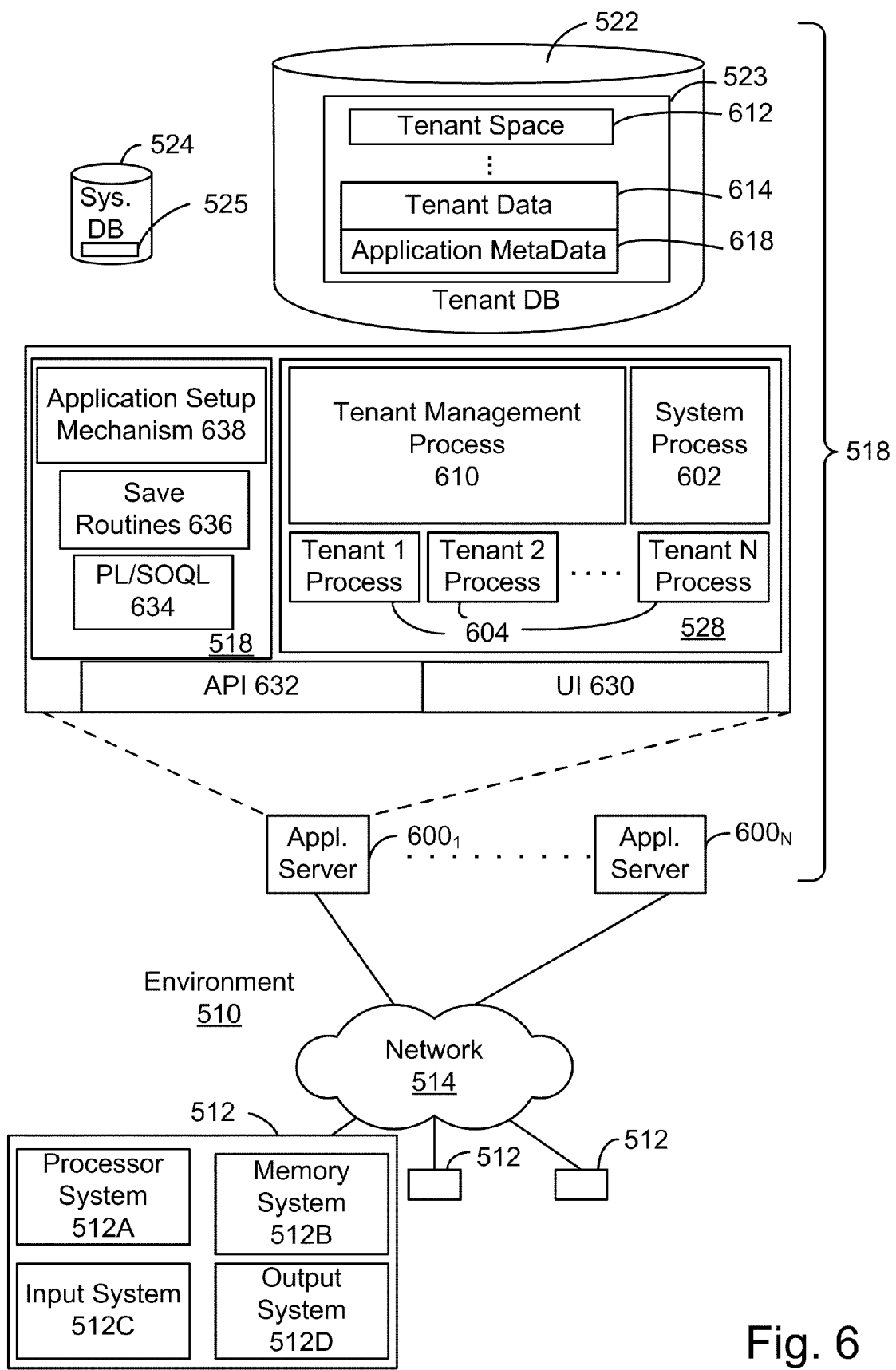
FIG. 6 shows a system diagram 510 further illustrating the architecture of a multitenant database environment, in accordance with one embodiment.

In some embodiments, the expected image is retrieved from a database accessible to a server, such as the multitenant database 522 in FIGS. 5-6. Alternately, the expected image may be retrieved from any other storage medium configured for storing images and any related information.

At 120, the test image is compared with the expected image. In some embodiments, the comparison may be performed by image comparison software such as ImageMagick® (available from ImageMagick Studio LLC), The GNU Image Manipulation Program (available from gimp.org), or GraphicsMagick (available from graphicsmagick.org).

In some embodiments, the comparison of the test image with the expected image may produce a comparison or difference image that illustrates any differences between the test image and the expected image. An example of such a comparison image is shown in FIG. 3C. As shown in FIG. 3C, differences between the two compared images may be emphasized, while similarities between the two compared images may be deemphasized.

At 122, a determination is made as to whether the test image and the expected image match. In some embodiments, the determination may be made automatically. For example, the image comparison software may determine whether the two images match based on whether any differences were identified during the comparison at 120. In some embodiments, the determination may be made by a user. For example, a comparison image such as the image shown in FIG. 3C may be presented to a user. The user may then indicate whether the images match.

In some embodiments, a determination that the two images match may be made even if minor differences exist between the two images. For example, the image comparison software may include parameters or settings that cause the software to ignore minor variations between the two images. One such parameter or setting may control the granularity of comparison. At a higher level of granularity, the image comparison software may not examine the image as closely as it would at a lower level of granularity.

In some embodiments, a "fuzz" setting may be used to ignore minor differences between images. A fuzz setting may be used to simulate the difference in how an image would appear when viewed from different distances (e.g., a few inches from a movie screen, the front row of a theater, the back row of a theater, etc.).

Set at a relatively low level, the fuzz setting may be used to ignore minor differences that could appear if identical inputs were rendered to create images on two different machines. Such images could have minor differences if, for example, the different machines had different anti-aliasing settings for fonts or other features. Set at a relatively high level, the fuzz setting may be used to ignore more significant differences between two images, such as a difference in font face.

In some instances, a mismatch between an expected image and a test image may be expected. For example, a developer may have modified the user interface component definition with the intention of effecting a change in the visual presentation of the user interface component. Accordingly, if the test image and the expected image do not match, a determination is made at 124 as to whether the output shown in the test image is expected.

The determination at 124 may be made by presenting a message to a user and receiving an indication from the user. The user may be, for example, the developer who modified the user interface component or who requested the visual comparison test at 102.

In some embodiments, the determination may be made by receiving the indication from the user in a user interface used to display the comparison. For example, the user may be presented with such an option in the user interface component comparison interface shown in FIGS. 3A-3C.

In some embodiments, the determination may be made by receiving a message from the user via e-mail or some other messaging service. For example, the method 100 may be run automatically or otherwise behind-the-scenes. If a developer is responsible for a user interface component that has generated a mismatch with an expected image, the developer may be sent an e-mail or other type of message indicating the difference. The message may request a response from the developer as to whether the test image reflects an expected visual presentation of the user interface component.

If the user interface component is displayed correctly, the image may be stored at 126 as an expected image for use in later comparisons. This stored image may also be known as a gold file, a reference image, or a baseline image.

In some embodiments, the new expected image may be stored in a database, such as the multitenant database 522 discussed with reference to FIGS. 5-6. Alternately, the new expected image may be stored in another storage medium where it will be accessible for later retrieval and comparison.

In some embodiments, other information may be stored in addition to the rendered image. For example, information used to generate the user interface component may be stored as well. This information may include source code, markup, test data, or other types of information. As another example, information specifying the location of dynamic output identified at 108 may be stored, along with any static output used to normalize the dynamic output. As yet another example, information may be stored that specifies the location and content of a mask applied at 116 to replace exempted portions of the user interface component.

In some embodiments, a method may be triggered at 126 to further process the user interface component prior to storage. An example of a method that may be used to generate and store an expected image is discussed with reference to FIG. 2.

At 128, an indication of an error is provided. In some embodiments, the indication of an error may be displayed on a display device. For example, the error indication may be displayed in a user interface such as the user interface component comparison interface shown in FIGS. 3A-3C.

In some embodiments, the indication of an error may be saved to a storage medium. For example, the indication of an error may be stored to indicate the user interface component did not pass the comparison test.

In some embodiments, the indication of an error may be transmitted to a developer or other user. For example, an e-mail or other message may be transmitted to a developer responsible for the user interface component, to an organization using the user interface component, or an administrator.

In some embodiments, a web application may store the results of the method 100 shown in FIG. 1. For example, the web application may store the failures, the successes, the test images, the diff images, the gold files, and any other information. This information may be tracked over time to provide an overview of the ongoing or new errors. Messages may be sent to the author of a test, the developers who most likely caused a failure, an administrator, or any other user or entity. Messages may include any of the stored information, a link to a website showing a log of the test run or the test results, or any other information.

In some embodiments, the operations shown in the method 100 may be arranged in an order different to that shown in FIG. 1. For example, the expected image may be retrieved earlier in the method, before client-side and/or server-side component generation operations are performed.

In some embodiments, one or more of the operations shown in the method 100 may be omitted. For example, some implementations may use only one of a masking mechanism or a normalization process to hide dynamic content. As another example, some user interface components may not include any dynamic content, so a masking mechanism and a normalization process may both be unnecessary.

In some embodiments, additional operations not shown in FIG. 1 may be performed. For example, a compression operation may be performed to reduce the file size of rendered images.

In various embodiments, the determinations or decisions shown in FIG. 1 may be made in different ways. Determinations may be made automatically by a computer process, manually by a user, or by some combination thereof. The indications of these determinations, as well as any accompanying messages, may be transmitted via a user interface such as that shown in FIGS. 3A-3C, via a message such as e-mail, or via some other communication mechanism.

In some embodiments, more than one expected image may be stored for a user interface component. Different expected images may be stored to reflect different visual presentations of a user interface component that may occur in different conditions. For example, different test data may cause a user interface component to behave in significantly different ways.

If more than one expected image is stored, then an additional selection or comparison operations may be performed in the method 100 shown in FIG. 1. For example, prior to operation 118, one or more of the stored expected images may be selected for retrieval. As another example, operation 120 may be performed for more than one expected image. By storing, selecting, and/or comparing with more than one expected image, techniques described herein may be used to test complex, dynamic, and multi-faceted user interface components that may have significantly different visual presentations upon successive renderings.

Figure 2:
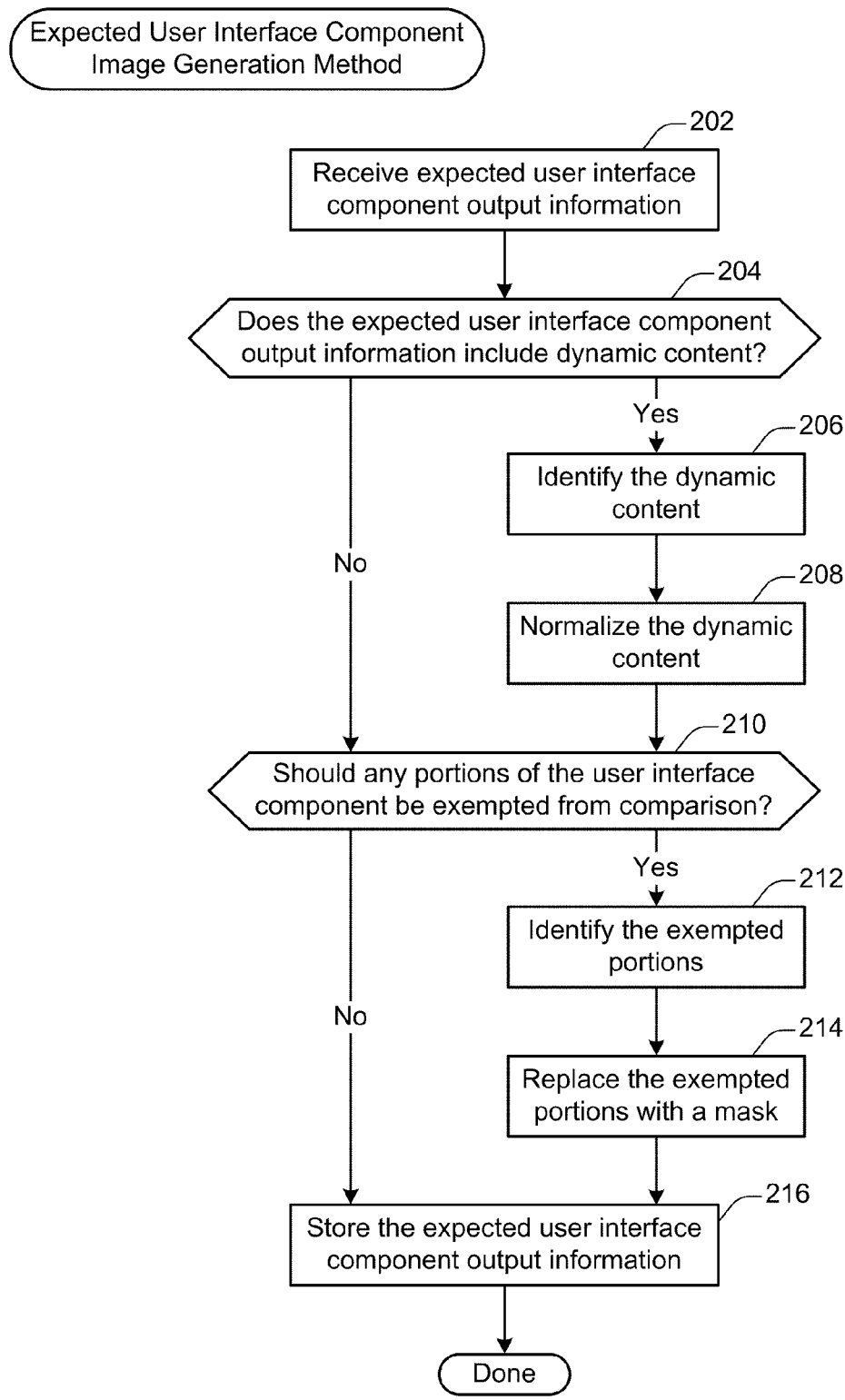
FIG. 2 shows a flow diagram of a method 200 for generating a user interface component expected image, performed in accordance with one embodiment.

FIG. 2 shows a flow diagram of a method 200 for generating a user interface component expected image, performed in accordance with one embodiment. The method 200 may receive information related to the expected appearance of a user interface component, perform any necessary modifications to this information, and save the expected user interface component output information for later use.

In some embodiments, the expected user interface component image generation method 200 may be performed at one or more servers, such as a server configured to provide services via an on-demand service environment. The server may have access to a database, such as a multitenant database accessible to a plurality of tenants in the on-demand service environment. Further details regarding servers, databases, and on-demand service environments according to various embodiments disclosed herein are discussed in greater detail with respect to FIGS. 4A-6.

In some embodiments, the expected user interface component image generation method 200 may be triggered by a user. For example, a user may request to initiate the method 200 in order to generate a new expected user interface component image for later comparison. As another example, the user may request to store a new expected image during the performance of another method, such as the user interface component comparison generation method 100 shown in FIG. 1. As discussed with respect to FIG. 1, the expected user interface component image generation method 200 may be triggered upon performance of operation 126.

In some embodiments, the expected user interface component image generation method 200 may be triggered automatically. For example, a computing device may make a determination that an identified user interface component image is serviceable as an expected image and may initiate the user interface component image generation method automatically to store the identified image as an expected image.

At 202, expected user interface component output information is received. This expected output information may include one or more rendered images of the user interface component, information identifying dynamic content within the user interface component, information identifying portions of the user interface component that should be exempted from comparison, or any other information. Additionally, or alternately, the expected output information may include markup, instructions, or data used to generate the user interface component.

In some embodiments, the expected output information may be determined at least partially automatically, such as via the user interface component comparison generation method 100 shown in FIG. 1. For example, the expected output information may include the image rendered at 112, the masked image created at 116, the information identifying dynamic output determined at 108, information regarding the dynamic output normalized at 110, or any other information.

In some embodiments, the expected output information may be received or determined at least partially via a user. For example, a user may specify an image, information identifying dynamic content, information identifying exempted portions of the user interface component, or other information relevant to the method 200 shown in FIG. 2.

In some embodiments, some user interface components may include dynamic content, as discussed with respect to FIG. 1. Dynamic content may include text, images, or other features that are determined dynamically at run-time. Dynamic content may be determined based on the data displayed via the user interface component, based on user preferences, or any other factors that might cause the same user interface component to appear different on successive renderings.

At 204, a determination is made as to whether the expected output information includes dynamic content. In some embodiments, this determination may be made automatically.

For example, the expected information may be analyzed to identify portions of the user interface component that may change between successive renderings. Analysis of the expected information may include analyzing source code or markup used to create the user interface component. As another example, the same user interface component may be rendered with different test data, and the different results may be used to identify the presence of dynamic content.

In some embodiments, the presence of dynamic content may be specified in the received expected output information or identified by a user. For example, a user may be presented with a rendered user interface component and asked to identify portions of the user interface component that include dynamic content.

At 206, if the expected output includes dynamic information, the dynamic content is identified and located within the expected user interface component output information. By identifying the location of the dynamic content information, the dynamic content can be normalized so that it appears the same on successive renderings of the user interface component.

In some embodiments, the dynamic content may be identified automatically, such as via analysis of the expected output information. Alternately, or additionally, the dynamic content may be identified by a user. For example, a user may highlight or select portions of the user interface component that include dynamic output.

At 208, the identified dynamic content is normalized. Normalizing the dynamic content may include any actions that would prevent the dynamic content from appearing as a difference in subsequent comparisons of the rendered user interface component to the expected output. Once the dynamic content is normalized, successive renderings of the dynamic portion of the user interface component may match the expected image despite the presence of dynamic content.

In some embodiments, the dynamic content may be normalized by providing standardized test data or system conditions for rendering the user interface component. For example, a user interface component may include a user name. In that case, the component may be set to display the same user name every time rather than a random user name or the user name of the current user. In this situation, normalizing the dynamic content may be more useful than masking, since normalized dynamic content may still reveal similarities or differences in factors such as font face, text color, text size, or other formatting.

In some embodiments, the dynamic output may be normalized by replacing the dynamic output with static output such as a standard image or block of text. In this case, the standard image or block of text, as well as identification information for the dynamic output, may be stored with the expected user interface component output information so that the dynamic output may be normalized in successive renderings of the user interface component.

In some embodiments, the dynamic output included in the expected information may be used as static output in future renderings. In this case, the dynamic output in the expected output may be stored for normalizing future dynamic output in successive renderings of the user interface component.

In some embodiments, source code or markup in the expected user interface component output information may be modified to normalize the dynamic content. For example, specialized tags may be inserted to identify the location of dynamic content and/or allow static content to be inserted in its place.

In some instances, dynamic portions of the user interface component may be replaced with a mask rather than with static content. A mask may be used to conceal portions of the user interface component that are unimportant for comparison, that are difficult to replace with static content, or that change frequently. For example, normalizing date or time displays by modifying the input used to render an image of a user interface component may be difficult because date or time displays often access a system time stamp rather than user-defined input data. As another example, a logo image may change between successive releases and thus may be a good candidate for masking. As yet another example, masking may be used to conceal differences between text that may assume a different font face or text color between successive renderings based on factors other than user-defined input, such as date or time.

At 210, a determination is made as to whether any portions of the user interface component should be exempted from comparison. In some embodiments, the determination may be made automatically, as discussed with respect to the dynamic content in operation 204. Alternately, or additionally, a determination may be made based on input received from a user. For example, a user may specify a portion of the user interface component that should be exempted from comparison.

At 212, an indication of the exempted portions is received. In some embodiments, the indication of the exempted portions may include coordinates specified in a coordinate system corresponding to the rendered user interface component. The coordinates may specify the boundaries of the exempted portions of the rendered user interface component.

In some embodiments, the indication of the exempted portions may include an indication of markup tags used to create or contain the exempted portions of the user interface component. For example, the indication may include an <IMG> HTML tag that displays a dynamically determined image.

In some embodiments, the indication of the exempted portions of the user interface component may be received from a dynamic process. For example, a dynamic process may analyze the user interface component by processing source code or data used to generate the user interface component. The dynamic process may identify, based on this analysis, portions of the user interface component that should be exempted from comparison.

In some embodiments, the indication of the exempted portions of the user interface component may be received from a user. For example, a user may select a portion of the rendered user interface component as exempted from comparison. This portion may be specified, for example, using coordinates, tags, or some other selection mechanism.

At 214, the exempted portions are replaced with a mask. In some embodiments, the mask may be a white region corresponding to the exempted portion. The mask may include a label identifying it as a mask. However, the appearance of the mask is unimportant so long as the location and content of the mask can be replicated in successive renderings of the user interface component. As long as a successive rendering of the user interface component applies the same mask in the same location, the mask will not register as a difference in the comparison of the actual user interface component image to the expected user interface component image.

At 216, the expected output information is stored. By storing the expected output information, successive renderings of the user interface component may be compared to the expected appearance of the user interface component.

In some embodiments, the expected output information may be stored in a database. For example, the expected output information may be stored in database 522 shown in FIGS. 5-6. However, the expected output information need not be stored in a database, and may be stored in any location from which it can later be retrieved.

In some embodiments, the expected user interface component output information stored at 216 may include any or all of the information received at 202. Thus, the expected output information stored at 216 may include rendered images, markup, computer code, test data, and/or information identifying dynamic content or exempted image portions.

In some embodiments, the expected output information received at 202 may have been updated at 208 or 214 by normalizing the dynamic output or by replacing certain portions of the rendered user interface component with a mask. This modified or updated expected output information may also be stored at 216, along with information facilitating similar modifications to successive renderings of the user interface component. Essentially, any information may be stored at 216 that would be useful for making comparisons with the expected appearance of the user interface component.

In some embodiments, the operations shown in the method 200 may be arranged in an order different to that shown in FIG. 2. For example, the masking process may be performed prior to the normalization of dynamic content.

In some embodiments, one or more of the operations shown in the method 200 may be omitted. For example, separately identifying the dynamic content at 206 or the exempted portions at 212 may be unnecessary if such identifying information was included with the expected user interface component output information at 202. In some embodiments, additional operations not shown in FIG. 2 may be performed.

For example, a compression operation may be performed to reduce the file size of rendered images.

In various embodiments, the determinations or decisions shown in FIG. 2 may be made in different ways. Determinations may be made automatically by a computer process, manually by a user, or by some combination thereof. The indications of these determinations, as well as any accompanying messages, may be transmitted via a user interface such as that shown in FIGS. 3A-3C, via a message such as e-mail, or via some other communication mechanism.

Figure 3A:
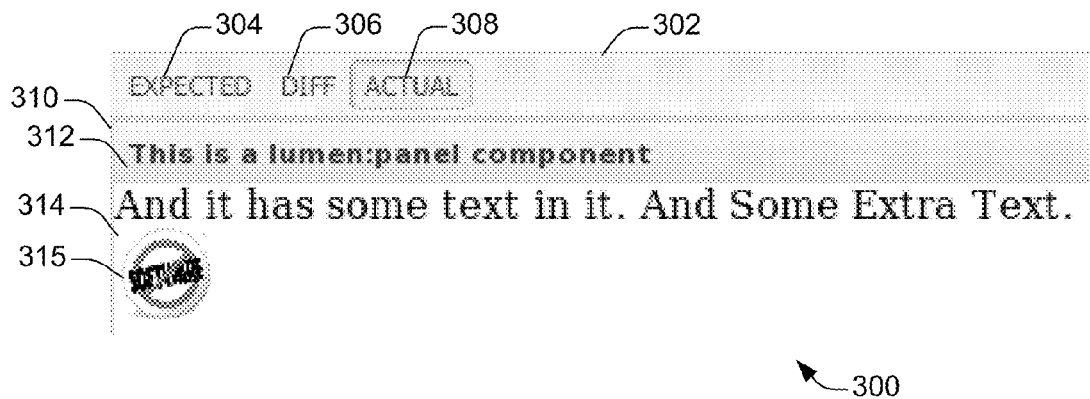
FIG. 3A shows an image of a user interface component comparison interface 300 presented on a computing device, in accordance with one or more embodiments.

FIG. 3A shows an image of a user interface component comparison interface 300 presented on a computing device, in accordance with one or more embodiments. The user interface component comparison interface 300 may be used to compare an actual image of a generated and rendered user interface component with an expected image of the generated and rendered user interface component. The actual image, also known as the test image, reflects a visual presentation of a generated user interface component. The expected image displays an expected visual presentation of the generated user interface component.

In some embodiments, the user interface component comparison interface 300 may be used in conjunction with a method for comparing user interface components such as the method 100 shown in FIG. 1. The user interface component comparison interface 300 may also be used in conjunction with a method for generating a user interface component expected image, such as the method 200 shown in FIG. 2. The user interface component comparison interface 300 may also be used without performing either of the methods shown in FIGS. 1 and 2, or may be used in conjunction with a different method.

In some embodiments, the user interface component comparison interface 300 includes a status bar 302, which includes an expected label 304, a diff label 306, and an actual label 308. The user interface component comparison interface 300 also includes a user interface component area 310. The user interface component area includes a title bar 312 and a content area 314.

In some embodiments, the status bar 302 may be used to display and/or select the user interface component image being displayed. In FIG. 3A, the actual label 308 is selected. Thus, the image displayed in the user interface component area 310 displays a visual presentation of the user interface component being tested. The actual user interface component is the user interface component that is being tested against an expected appearance of the visual presentation.

Figure 3B:
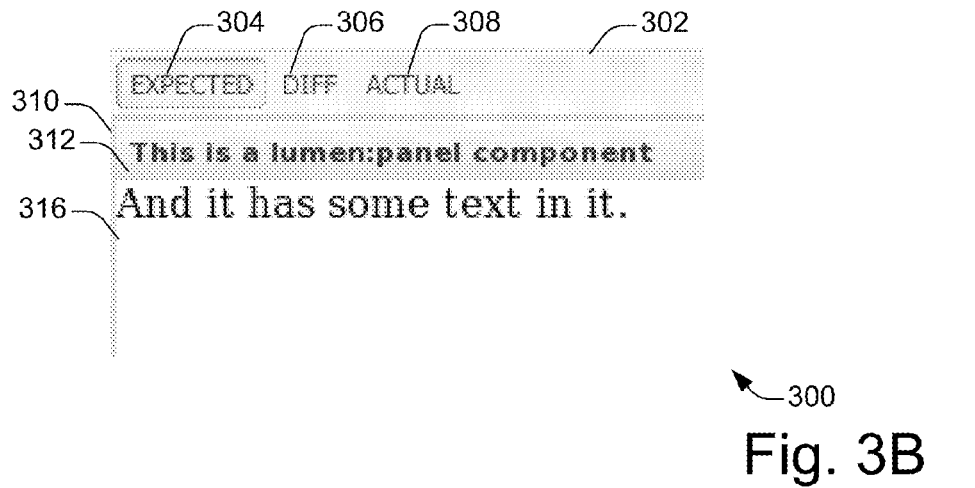
FIG. 3B shows an image of a user interface component comparison interface 300 presented on a computing device, in accordance with one or more embodiments.
Figure 3C:
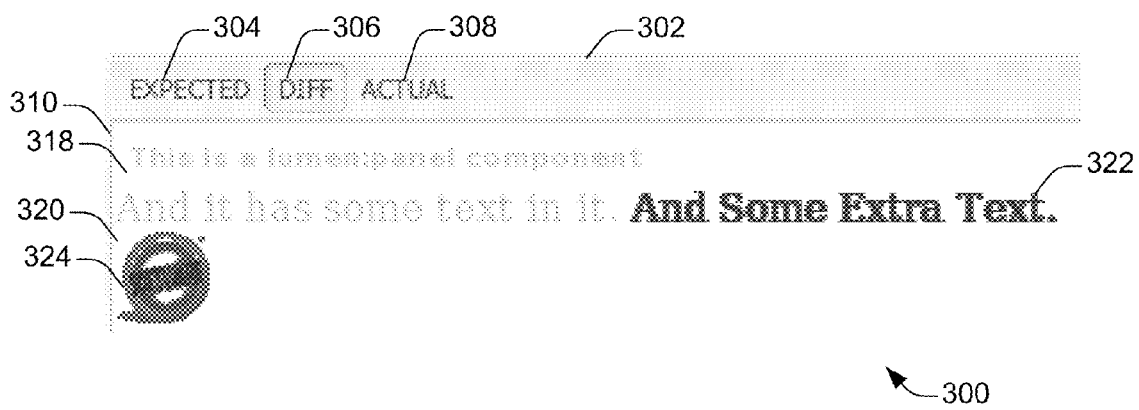
FIG. 3C shows an image of a user interface component comparison interface 300 presented on a computing device, in accordance with one or more embodiments.

The user interface component used for the comparison shown in FIGS. 3A-3C is a relatively simple user interface component that includes only a few features. However, the user interface component comparison interface 300 may be used to compare various types and sizes of user interface components.

In the example shown in FIG. 3A, the actual user interface component image includes a title bar 312 that states: "This is a lumen:panel component." The actual user interface component image also includes a content area 314 that states: "And it has some text in it. And Some Extra Text." The content area 314 also includes an image 315. As is shown in FIGS. 3B and 3C, this user interface component actual image may be compared to a user interface component test image.

FIG. 3B shows an image of the user interface component comparison interface 300 presented on a computing device, in accordance with one or more embodiments. The user interface component comparison interface 300 shown in FIG. 3B is the same as that shown in FIG. 3A, except that the expected image rather than the actual image is displayed in FIG. 3B.

In FIG. 3B, the expected label 304 is selected in the status bar 302. Thus, the image displayed in the user interface component area 310 is of the expected user interface component. The expected user interface component image displays a visual presentation of user interface component as it is expected to appear.

If the image of actual user interface component displayed in FIG. 3A matches the expected user interface component image shown in FIG. 3B, then the actual user interface component passes the comparison test, as discussed with respect to FIG. 1. If instead the actual user interface component image differs from the expected user interface component image, then the actual user interface component does not pass the comparison test.

In the example shown in FIG. 3B, the expected user interface component image includes a title bar 312 that states: "This is a lumen:panel component." The expected user interface component also includes a content area 316 that states: "And it has some text in it." The content area 316 does not include an image in FIG. 3B, in contrast to the content area 314 shown in FIG. 3A. Thus, the actual and expected images differ in some ways.

FIG. 3C shows an image of the user interface component comparison interface 300 presented on a computing device, in accordance with one or more embodiments. The user interface component comparison interface 300 shown in FIG. 3C is the same as that shown in FIGS. 3A and 3B, except that a comparison between the expected image and the actual image is displayed rather than either of the expected or actual images in isolation.

In FIG. 3C, the diff label 306 is selected in the status bar 302. Thus, the image displayed in the user interface component area 310 is of a comparison or difference. That is, the image shown in the user interface component area 310 illustrates similarities and differences between the actual user interface component image, shown in FIG. 3A, and the expected user interface component image, shown in FIG. 3B.

In some embodiments, similarities between the two images may be shown by displaying the similar regions in a lightened or otherwise deemphasized state. For example, the actual and expected images include an identical title bar 312. Accordingly, a similar title bar 318 is displayed in the difference image shown in FIG. 3. However, the title bar 318 is a low-contrast image since the title bar area is not a difference between the two images.

The content area 320 includes the text: "And it has some text in it." As with the title bar 318, this text is displayed in low-contrast because the actual and expected images are identical in this regard.

In some embodiments, differences between the two images may be highlighted or displayed in higher contrast than similarities. By emphasizing differences between the two images, the user interface component comparison interface 300 may allow a user to focus on the salient aspects of the comparison.

For example, the content area 320 includes text 322 that states: "And Some Extra Text." The content area 320 also includes an image 324 that is similar to the image 315 shown in the content area 314 in FIG. 3A. Both the text 322 and the image 324 are highlighted in red because they appear in the actual image shown in FIG. 3A but not in the expected image shown in FIG. 3B. Thus, a user may use the comparison interface shown in FIGS. 3A-3C to identify deviations in the visual presentation of a user interface component from an expected visual presentation of the user interface component.

Figure 4A:
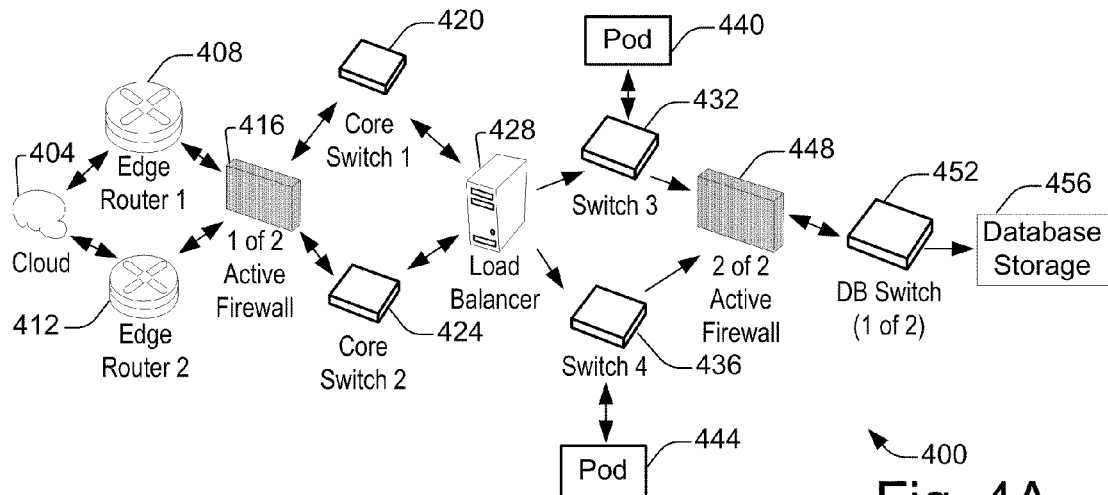
FIG. 4A shows a system diagram 400 illustrating architectural components of an on-demand service environment, in accordance with one embodiment.

FIG. 4A shows a system diagram 400 illustrating architectural components of an on-demand service environment, in accordance with one embodiment.

A client machine located in the cloud 404 (or Internet) may communicate with the on-demand service environment via one or more edge routers 408 and 412. The edge routers may communicate with one or more core switches 420 and 424 via firewall 416. The core switches may communicate with a load balancer 428, which may distribute server load over different pods, such as the pods 440 and 444. The pods 440 and 444, which may each include one or more servers and/or other computing resources, may perform data processing and other operations used to provide on-demand services. Communication with the pods may be conducted via pod switches 432 and 436. Components of the on-demand service environment may communicate with a database storage system 456 via a database firewall 448 and a database switch 452.

Figure 4B:
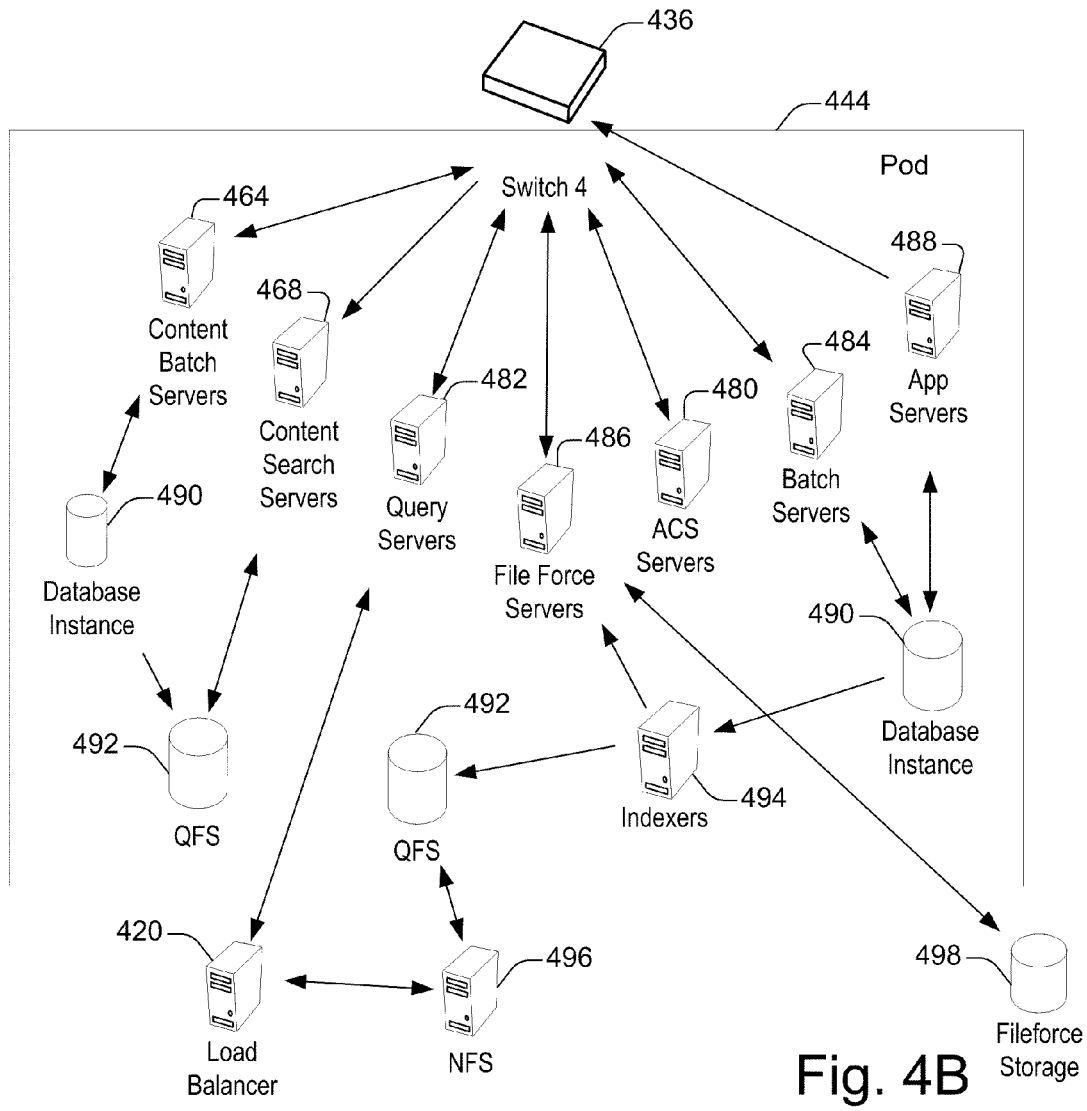
FIG. 4B shows a system diagram further illustrating architectural components of an on-demand service environment, in accordance with one embodiment.

As shown in FIGS. 4A and 4B, accessing an on-demand service environment may involve communications transmitted among a variety of different hardware and/or software components. Further, the on-demand service environment 400 is a simplified representation of an actual on-demand service environment. For example, while only one or two devices of each type are shown in FIGS. 4A and 4B, some embodiments of an on-demand service environment may include anywhere from one to many devices of each type. Also, the on-demand service environment need not include each device shown in FIGS. 4A and 4B, or may include additional devices not shown in FIGS. 4A and 4B.

Moreover, one or more of the devices in the on-demand service environment 400 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 404 is intended to refer to a data network or plurality of data networks, often including the Internet. Client machines located in the cloud 404 may communicate with the on-demand service environment to access services provided by the on-demand service environment. For example, client machines may access the on-demand service environment to retrieve, store, edit, and/or process information.

In some embodiments, the edge routers 408 and 412 route packets between the cloud 404 and other components of the on-demand service environment 400. The edge routers 408 and 412 may employ the Border Gateway Protocol (BGP). The BGP is the core routing protocol of the Internet. The edge routers 408 and 412 may maintain a table of IP networks or 'prefixes' which designate network reachability among autonomous systems on the Internet.

In one or more embodiments, the firewall 416 may protect the inner components of the on-demand service environment 400 from Internet traffic. The firewall 416 may block, permit, or deny access to the inner components of the on-demand service environment 400 based upon a set of rules and other criteria. The firewall 416 may act as one or more of a packet filter, an application gateway, a stateful filter, a proxy server, or any other type of firewall.

In some embodiments, the core switches 420 and 424 are high-capacity switches that transfer packets within the on-demand service environment 400. The core switches 420 and 424 may be configured as network bridges that quickly route data between different components within the on-demand service environment. In some embodiments, the use of two or more core switches 420 and 424 may provide redundancy and/or reduced latency.

In some embodiments, the pods 440 and 444 may perform the core data processing and service functions provided by the on-demand service environment. Each pod may include various types of hardware and/or software computing resources. An example of the pod architecture is discussed in greater detail with reference to FIG. 4B.

In some embodiments, communication between the pods 440 and 444 may be conducted via the pod switches 432 and 436. The pod switches 432 and 436 may facilitate communication between the pods 440 and 444 and client machines located in the cloud 404, for example via core switches 420 and 424. Also, the pod switches 432 and 436 may facilitate communication between the pods 440 and 444 and the database storage 456.

In some embodiments, the load balancer 428 may distribute workload between the pods 440 and 444. Balancing the on-demand service requests between the pods may assist in improving the use of resources, increasing throughput, reducing response times, and/or reducing overhead. The load balancer 428 may include multilayer switches to analyze and forward traffic.

In some embodiments, access to the database storage 456 may be guarded by a database firewall 448. The database firewall 448 may act as a computer application firewall operating at the database application layer of a protocol stack. The database firewall 448 may protect the database storage 456 from application attacks such as structure query language (SQL) injection, database rootkits, and unauthorized information disclosure.

In some embodiments, the database firewall 448 may include a host using one or more forms of reverse proxy services to proxy traffic before passing it to a gateway router. The database firewall 448 may inspect the contents of database traffic and block certain content or database requests. The database firewall 448 may work on the SQL application level atop the TCP/IP stack, managing applications' connection to the database or SQL management interfaces as well as intercepting and enforcing packets traveling to or from a database network or application interface.

In some embodiments, communication with the database storage system 456 may be conducted via the database switch 452. The multi-tenant database system 456 may include more than one hardware and/or software components for handling database queries. Accordingly, the database switch 452 may direct database queries transmitted by other components of the on-demand service environment (e.g., the pods 440 and 444) to the correct components within the database storage system 456.

In some embodiments, the database storage system 456 is an on-demand database system shared by many different organizations. The on-demand database system may employ a multi-tenant approach, a virtualized approach, or any other type of database approach. An on-demand database system is discussed in greater detail with reference to FIGS. 5 and 6.

FIG. 4B shows a system diagram illustrating the architecture of the pod 444, in accordance with one embodiment. The pod 444 may be used to render services to a user of the on-demand service environment 400.

In some embodiments, each pod may include a variety of servers and/or other systems. The pod 444 includes one or more content batch servers 464, content search servers 468, query servers 472, file force servers 476, access control system (ACS) servers 480, batch servers 484, and app servers 488. Also, the pod 444 includes database instances 490, quick file systems (QFS) 492, and indexers 494. In one or more embodiments, some or all communication between the servers in the pod 444 may be transmitted via the switch 436.

In some embodiments, the application servers 488 may include a hardware and/or software framework dedicated to the execution of procedures (e.g., programs, routines, scripts) for supporting the construction of applications provided by the on-demand service environment 400 via the pod 444. Some such procedures may include operations for providing the services described herein.

The content batch servers 464 may requests internal to the pod. These requests may be long-running and/or not tied to a particular customer. For example, the content batch servers 464 may handle requests related to log mining, cleanup work, and maintenance tasks.

The content search servers 468 may provide query and indexer functions. For example, the functions provided by the content search servers 468 may allow users to search through content stored in the on-demand service environment.

The Fileforce servers 476 may manage requests information stored in the Fileforce storage 478. The Fileforce storage 478 may store information such as documents, images, and basic large objects (BLOBs). By managing requests for information using the Fileforce servers 476, the image footprint on the database may be reduced.

The query servers 472 may be used to retrieve information from one or more file systems. For example, the query system 472 may receive requests for information from the app servers 488 and then transmit information queries to the NFS 496 located outside the pod.

The pod 444 may share a database instance 490 configured as a multi-tenant environment in which different organizations share access to the same database. Additionally, services rendered by the pod 444 may require various hardware and/or software resources. In some embodiments, the ACS servers 480 may control access to data, hardware resources, or software resources.

In some embodiments, the batch servers 484 may process batch jobs, which are used to run tasks at specified times.

Thus, the batch servers 484 may transmit instructions to other servers, such as the app servers 488, to trigger the batch jobs.

In some embodiments, the QFS 492 may be an open source file system available from Sun Microsystems® of Santa Clara, Calif. The QFS may serve as a rapid-access file system for storing and accessing information available within the pod 444. The QFS 492 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 468 and/or indexers 494 to identify, retrieve, move, and/or update data stored in the network file systems 496 and/or other storage systems.

In some embodiments, one or more query servers 472 may communicate with the NFS 496 to retrieve and/or update information stored outside of the pod 444. The NFS 496 may allow servers located in the pod 444 to access information to access files over a network in a manner similar to how local storage is accessed.

In some embodiments, queries from the query servers 422 may be transmitted to the NFS 496 via the load balancer 420, which may distribute resource requests over various resources available in the on-demand service environment. The NFS 496 may also communicate with the QFS 492 to update the information stored on the NFS 496 and/or to provide information to the QFS 492 for use by servers located within the pod 444.

In some embodiments, the pod may include one or more database instances 490. The database instance 490 may transmit information to the QFS 492. When information is transmitted to the QFS, it may be available for use by servers within the pod 444 without requiring an additional database call.

In some embodiments, database information may be transmitted to the indexer 494. Indexer 494 may provide an index of information available in the database 490 and/or QFS 492. The index information may be provided to file force servers 476 and/or the QFS 492.

FIG. 5 shows a block diagram of an environment 510 wherein an on-demand database service might be used, in accordance with one embodiment.

Environment 510 includes an on-demand database service 516. User system 512 may be any machine or system that is used by a user to access a database user system. For example, any of user systems 512 can be a handheld computing device, a mobile phone, a laptop computer, a work station, and/or a network of computing devices. As illustrated in FIGS. 5 and 6, user systems 512 might interact via a network 514 with the on-demand database service 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 516" and "system 516" will be used interchangeably herein. A database image may include one or more database objects. A relational database management system (RDBMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

The users of user systems 512 may differ in their respective capacities, and the capacity of a particular user system 512 might be entirely determined by permissions (permission levels) for the current user. For example, where a call center agent is using a particular user system 512 to interact with system 516, the user system 512 has the capacities allotted to that call center agent. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, web pages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications. User (or third party developer) applications, which may or may not include CRM, may be supported by the application platform 518, which manages creation, storage of the applications into one or more database objects and executing of the applications in a virtual machine in the process space of the system 516.

Each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514.

Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 516 is configured to provide web pages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also shows a block diagram of environment 510 further illustrating system 516 and various interconnections, in accordance with one embodiment. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers 6001-600N, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of processors. Memory system 512B may be any combination of one or more memory devices, short term, and/or long term memory. Input system 512C may be any combination of input devices, such as keyboards, mice, trackballs, scanners, cameras, and/or interfaces to networks. Output system 512D may be any combination of output devices, such as monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as Oracle™ databases.

Application platform 518 includes an application setup mechanism 638 that supports application developers' creation and management of applications, which may be saved as metadata into tenant data storage 522 by save routines 636 for execution by subscribers as tenant process spaces 604 managed by tenant management process 610 for example. Invocations to such applications may be coded using PL/SOQL 34 that provides a programming language style interface extension to API 632. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600₁ might be coupled via the network 514 (e.g., the Internet), another application server 600N-1 might be coupled via a direct network link, and another application server 600N might be coupled by yet a different network connection. Transfer Control Protocol and Internet Protocol (TCP/IP) are typical protocols for communicating between application servers 600 and the database system. However, other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each call center agent uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client machines/systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method of testing a user interface component, the method comprising:

retrieving, by one or more server computing systems, client-executable code for rendering a user interface component on a client computing system, the client-executable code configured such that the rendering of at least a portion of the user interface component is capable of being performed by a client-side rendering application executing within the client computing system when the client-executable code is provided to the client computing system;

executing, by the one or more server computing systems during a testing operation, the client-executable code, the executing simulating the rendering of the portion of the user interface component by the client-side rendering application;

storing, by the one or more server computing systems, the rendered portion of the user interface component as a test image, the test image simulating a visual presentation of the portion of the user interface component as the user interface component would appear when rendered by the client-side rendering application at the client computing system;

retrieving, by the one or more server computing systems, an expected image representing an expected visual presentation of the rendered portion of the user interface component;

cropping or masking, by the one or more server computing systems, one or more portions of the test image to produce one or more exempted portions to not be compared with one or more corresponding portions of the expected image;

determining, by the one or more server computing systems, whether the test image matches the expected image; and when the test image does not match the expected image, providing, by the one or more server computing systems, an indication of an error condition.

2. The method recited in claim 1, wherein determining whether the test image matches the expected image comprises identifying one or more differences between the test image and the expected image.

3. The method recited in claim 2, wherein determining whether the test image matches the expected image further comprises determining whether the identified one or more differences meet a designated difference threshold.

4. The method recited in claim 1, the method further comprising:

determining whether the user interface component includes a dynamic output portion capable of changing states between successive renderings of the user interface component.

5. The method recited in claim 4, the method further comprising:
when the user interface component includes the dynamic output portion, replacing the dynamic output portion with a static output portion incapable of changing states between successive renderings of the user interface component.

6. The method recited in claim 4, the method further comprising:
determining that the dynamic output portion includes dynamically generated or selected text; and
replacing the dynamically generated or selected text with static text.

7. The method recited in claim 4, the method further comprising:
determining that the dynamic output portion includes a dynamically generated or selected image; and
replacing the dynamically generated or selected image with a static image.

8. The method recited in claim 1, the method further comprising:
transmitting, to a user, a message requesting an indication as to whether the test image is to be stored as a new expected image for the user interface component.

9. The method recited in claim 8, the method further comprising:
receiving the indication from the a user that the test image is to be stored as the new expected image; and
storing the new expected image.

10. A system configured to communicate with one or more client computing systems, the system comprising:
a memory device; and
a processor system comprising one or more processors, the processor system configured to:
retrieve client-executable code for rendering a user interface component on a client computing system, the client-executable code configured such that the rendering of at least a portion of the user interface component is capable of being performed by a client-side rendering application executing within the client computing system when the client-executable code is provided to the client computing system;
execute, during a testing operation, the client-executable code, the executing simulating the rendering of the portion of the user interface component by the client-side rendering application;
store the rendered portion of the user interface component as a test image, the test image simulating a visual presentation of the portion of the user interface component as the user interface component would appear when rendered by the client-side rendering application at the client computing system;
retrieve an expected image representing an expected visual presentation of the rendered portion of the user interface component;
crop or mask one or more portions of the test image to produce one or more exempted portions to not be compared with one or more corresponding portions of the expected image;
determine whether the test image matches the expected image; and
when the test image does not match the expected image, provide an indication of an error condition.

11. The system recited in claim 10, wherein determining whether the test image matches the expected image comprises identifying one or more differences between the test image and the expected image.

12. The system recited in claim 11, wherein determining whether the test image matches the expected image further comprises determining whether the identified one or more differences meet a designated difference threshold.

13. The system recited in claim 10, the processor system being further configured to:
determine whether the user interface component includes a dynamic output portion capable of changing states between successive renderings of the user interface component.

14. The system recited in claim 13, the processor system being further configured to:
when the user interface component includes the dynamic output portion, replace the dynamic output portion with a static output portion incapable of changing states between successive renderings of the user interface component.

15. The system recited in claim 10, the processor system being further configured to:
transmit, to a user, a message requesting an indication as to whether the test image is to be stored as a new expected image for the user interface component.

16. The system recited in claim 15, wherein the processor system is further configured to:
receive the indication from the a user that the test image is to be stored as the new expected image; and
store the new expected image.

17. One or more non-transitory computer readable media having instructions stored thereon for testing a user interface component, the instructions, when executed by one or more processing systems, operable to cause the one or more processing systems to:
retrieve client-executable code for rendering a user interface component on a client computing system, the client-executable code configured such that the rendering of at least a portion of the user interface component is capable of being performed by a client-side rendering application executing within the client computing system when the client-executable code is provided to the client computing system;
execute, during a testing operation, the client-executable code, the executing simulating the rendering of the portion of the user interface component by the client-side rendering application;
store the rendered portion of the user interface component as a test image, the test image simulating a visual presentation of the portion of the user interface component as the user interface component would appear when rendered by the client-side rendering application at the client computing system;
retrieve an expected image representing an expected visual presentation of the rendered portion of the user interface component;
crop or mask one or more portions of the test image to produce one or more exempted portions to not be compared with one or more corresponding portions of the expected image;
determine whether the test image matches the expected image; and
when the test image does not match the expected image, provide an indication of an error condition.

18. The one or more non-transitory computer readable media recited in claim 17, wherein to determine whether the test image matches the expected image, the media include instructions operable, when executed by the one or more processing systems, to identify one or more differences between the test image and the expected image.

19. The one or more non-transitory computer readable media recited in claim 18, wherein to determine whether the test image matches the expected image, the media include instructions operable, when executed by the one or more processing systems, to determine whether the identified one or more differences meet a designated difference threshold.

20. The one or more non-transitory computer readable media recited in claim 17, the instructions further being operable, when executed by the one or more processing systems, to:
  determine whether the user interface component includes a dynamic output portion capable of changing states between successive renderings of the user interface component.

21. The one or more non-transitory computer readable media recited in claim 20, the instructions further being operable, when executed by the one or more processing systems, to:
  when the user interface component includes the dynamic output portion, replace the dynamic output portion with a static output portion incapable of changing states between successive renderings of the user interface component.

22. The one or more non-transitory computer readable media recited in claim 17, the instructions further being operable, when executed by the one or more processing systems, to:
  transmit, to a user, a message requesting an indication as to whether the test image is to be stored as a new expected image for the user interface component.

23. The one or more non-transitory computer readable media recited in claim 22, the instructions further being operable, when executed by the one or more processing systems, to:
  receive the indication from the a user that the test image is to be stored as the new expected image; and
  store the new expected image.

* * * * *